United States Patent
Rosset et al.

(10) Patent No.: US 11,615,149 B2
(45) Date of Patent: Mar. 28, 2023

(54) NEURAL NETWORK FOR SEARCH RETRIEVAL AND RANKING

(71) Applicant: Microsoft Technology Licensing, LLC, Redmond, WA (US)

(72) Inventors: Corbin Louis Rosset, Seattle, WA (US); Bhaskar Mitra, Montreal (CA); David Anthony Hawking, Canberra (AU); Nicholas Eric Craswell, Seattle, WA (US); Fernando Diaz, Montreal (CA); Emine Yilmaz, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 606 days.

(21) Appl. No.: 16/423,081

(22) Filed: May 27, 2019

(65) Prior Publication Data

US 2020/0380038 A1    Dec. 3, 2020

(51) Int. Cl.
*G06F 16/30* (2019.01)
*G06F 16/9038* (2019.01)
*G06N 3/08* (2023.01)

(52) U.S. Cl.
CPC ........... *G06F 16/9038* (2019.01); *G06N 3/08* (2013.01)

(58) Field of Classification Search
CPC ............... G06F 16/9038; G06N 3/08
See application file for complete search history.

(56) References Cited

U.S. PATENT DOCUMENTS

2007/0198459 A1* 8/2007 Boone ................. G06F 16/9535
2008/0288483 A1 11/2008 Lin et al.

(Continued)

FOREIGN PATENT DOCUMENTS

EP    1818839 A1    8/2007

OTHER PUBLICATIONS

Survey Sampling Methods, indexed and archived on Apr. 1, 2012 by web.archive.org, retrieved from the Internet, retrieved at <URL: https://stattrek.com/survey-research/sampling-methods.aspx> (Year: 2012).*
Ganesan, What are Stop Words, Apr. 6, 2019, retrieved on Dec. 13, 2021, retrieved from the Internet <URL: https://www.opinosis-analytics.com/knowledge-base/stop-words-explained/#.YbemevnMJaQ > (Year: 2019).*
"International Search Report and Written Opinion Issued in PCT Application No. PCT/US20/024540", dated Jun. 24, 2020, 8 Pages.

(Continued)

*Primary Examiner* — Tyler J Torgrimson
(74) *Attorney, Agent, or Firm* — Calfee, Halter & Griswold LLP

(57) ABSTRACT

Described herein is a mechanism for utilizing a neural network to identify and rank search results. A machine learning model is trained by converting training data comprising query-document entries into query term-document entries. The query term-document entries are utilized to train the machine learning model. A set of query terms are identified. The query terms can be derived from a query history. The trained machine learning model is used to calculate document ranking scores for the query terms and the resultant scores are stored in a pre-calculated term-document index. A query to search the document index is broken down into its constituent terms and an aggregate document ranking score is calculated from a weighted sum of the document ranking scores corresponding to the individual query terms. Because the term-document index can be pre-calculated, it can be downloaded to provide deep learning search capabilities in a computationally limited environment.

14 Claims, 9 Drawing Sheets

(56) References Cited

U.S. PATENT DOCUMENTS

2018/0101791 A1 4/2018 Viswanathan
2019/0325050 A1* 10/2019 Diamanti ............ G06F 16/3326

OTHER PUBLICATIONS

Anh, et al., "Pruned Query Evaluation Using Pre-computed Impacts", In Proceedings of the 29th Annual International ACM SIGIR Conference on Research and Development in Information Retrieval, Aug. 6, 2006, pp. 372-379.

Anh, et al., "Simplified Similarity Scoring Using Term Ranks", In Proceedings of the 28th Annual International ACM SIGIR Conference on Research and Development in Information Retrieval, Aug. 15, 2005, pp. 226-233.

Anh, et al., "Vector-space Ranking with Effective Early Termination", In the Proceedings of the 24th Annual International ACM SIGIR Conference on Research and Development in Information Retrieval, Sep. 1, 2001, pp. 35-42.

Aumuller, et al., "Ann-Benchmarks: A benchmarking Tool for Approximate Nearest Neighbor Algorithms", In Proceedings of 10th International Conference on Similarity Search and Applications, Oct. 4, 2017, 20 Pages.

Bajaj, et al., "Ms Marco: A Human Generated Machine Reading Comprehension Dataset", In the Proceedings of 30th Conference on Neural Information Processing Systems, Dec. 9, 2016, 11 Pages.

Berger, et al., "Information Retrieval as Statistical Translation", In Proceedings of the 22nd Annual International ACM SIGIR Conference on Research and Development in Information Retrieval, Aug. 1, 1999, 8 Pages.

Burges, et al., "Learning to Rank using Gradient Descent", In the Proceedings of the 22nd International Conference on Machine Learning, Aug. 2005, pp. 89-96.

Craswell, Nick, "Mean Reciprocal Rank", In Encyclopedia of Database Systems, Jan. 2009, 1 Page.

Dai, et al., "Convolutional Neural Networks for Soft-Matching N-Grams in Ad-hoc Search", In Proceedings of the Eleventh ACM International Conference on Web Search and Data Mining, Feb. 5, 2018, pp. 126-134.

Devlin, et al., "BERT: Pre-training of Deep Bidirectional Transformers for Language Understanding", In the Journal of The Computing Research Repository, Oct. 11, 2018, 14 Pages.

Dietz, et al., "Tree Complex Answer Retrieval Overview", In Proceedings of TREC, Jan. 2017, 13 Pages.

Ganguly, et al., "A Word Embedding Based Generalized Language Model for Information Retrieval", In Proceedings of 38th International ACM SIGIR Conference on Research and Development in Information Retrieval, Aug. 9, 2015, pp. 795-798.

Gao, et al., "Clickthrough-Based Latent Semantic Models for Web Search", In Proceedings of the 34th International ACM SIGIR Conference on Research and Development in Information Retrieval, Jul. 2011, pp. 675-684.

Glorot, et al., "Deep Sparse Rectifier Neural Networks", In Proceedings of the Fourteenth International Conference on Artificial Intelligence and Statistics, Apr. 11, 2011, pp. 315-323.

Herbrich, et al., "Large Margin Rank Boundaries for Ordinal Regression", In Proceedings of the Advances in Large margin Classifiers, Mar. 1, 2000, pp. 115-132.

Hiemstra, Djoerd, "Using Language Models for Information Retrieval", In the Publication of Taaluitgeverij Neslia Paniculata, Jan. 2001, 178 Pages.

Huang, et al., "Learning Deep Structured Semantic Models for Web Search Using Clickthrough Data", In the Proceedings of the 22nd ACM International Conference on Information & Knowledge Management, Oct. 27, 2013, pp. 2333-2338.

Kenter, et al., "Short Text Similarity with Word Embeddings", In the Proceedings of the 24th ACM International on Conference on Information and Knowledge Management, Oct. 17, 2015, pp. 1411-1420.

Kwiatkowski, et al., "Natural Questions: a Benchmark for Question Answering Research", In the Journal of Transactions of the Association of Computational Linguistics, Jan. 2019, 14 Pages.

Matveeva, et al., "High Accuracy Retrieval with Multiple Nested Ranker", In Proceedings of the 29th Annual International ACM SIGIR Conference on Research and Development in Information Retrieval, Aug. 6, 2006, pp. 437-444.

Mitra, et al., "An Introduction to Neural Information Retrieval", In the Journal of Foundations and Trends in Information Retrieval, vol. 13, Issue 1, 2018, 119 Pages.

Mitra, et al., "Learning to Match Using Local and Distributed Representations of Text for Web Search", In Proceedings of the 26th International Conference on Worid Wide Web, Apr. 3, 2017, pp. 1291-1299.

Nalisnick, et al., "Improving Document Ranking with Dual Word Embeddings", In Proceedings of the 25th International Conference Companion on World Wide Web, Apr. 11, 2016, pp. 83-84.

Nanni, et al., "Benchmark for Complex Answer Retrieval", In Proceedings of the ACM SIGIR International Conference on Theory of Information Retrieval, Oct. 1, 2017, pp. 293-296.

Nogueira, et al., "Passage Re-Ranking with Bert", In the Journal of The Computing Research Repository, Feb. 18, 2019, 5 Pages.

Pang, et al., "A Study of Matchpyramid Models on Ad-Hoc Retrieval", In the Journal of Computing Research Repository, Jun. 15, 2016, 5 Pages.

Ponte, et al., "A Language Modeling Approach to Information Retrieval", In Proceedings of the 21st Annual International ACM SIGIR Conference on Research and Development in Information Retrieval, Aug. 1, 1998, pp. 275-281.

Robertson, et al., "The probabilistic Relevance Framework: BM25 and Beyond", In Journal of Foundations and Trends in Information Retrieval, vol. 03, Issue 4, Apr. 2009, pp. 333-389.

Witten, et al., "Managing Gigabytes: Compressing and Indexing Documents and Images", By Morgan Kaufmann Publishing, May 17, 1999, 551 Pages.

Xiong, et al., "End-to-end Neural Ad-hoc Ranking with Kernel Pooling", In Proceedings of the 40th Annual International ACM SIGIR Conference on Research and Development in Information Retrieval, Aug. 2017, pp. 55-64.

Zamani, et al., "From neural re-ranking to neural ranking: Learning a sparse representation for inverted indexing", In Proceedings of the 27th ACM International Conference on Information and Knowledge Management, Oct. 17, 2018, pp. 497-506.

Zhai, et al., "A Study of Smoothing Methods for Language Models Applied to Ad Hoc Information Retrieval", In Proceedings of the 24th Annual International ACM SIGIR Conference on Research and Development in Information Retrieval, Sep. 1, 2001, 9 Pages.

Zobel, et al., "Inverted Files for Text Search Engines", In Journal of ACM Computing Surveys, vol. 38, Issue 2, Jul. 2006, 56 Pages.

"Kernel Based Neural Ranking Models", Retrieved From: https://github.com/thunlp/Kernel-Based-Neural-Ranking-Models, Retrieved on: Jan. 31, 2019, 2 Pages.

"Ms Marco", Retrieved From: https://github.com/dfcf93/MSMARCO/blob/master/Ranking/Baselines/Duet.ipynb, Retrieved on: Feb. 20, 2019, 8 Pages.

"Ms Marco DataSets", Retrieved From: http://www.msmarco.org/leaders.aspx, Retrieved on: May 20, 2019, 10 Pages.

"Office Action Issued in European Patent Application No. 20720603.8", dated Dec. 21, 2022, 5 Pages.

* cited by examiner

NEURAL NETWORK FOR SEARCH RETRIEVAL AND RANKING

FIELD

This application relates generally to use of neural networks in search retrieval and ranking. More specifically, this application relates to improvements in neural networks for retrieval of documents and ranking of documents in information retrieval systems.

BACKGROUND

Information retrieval systems, such as internet search systems operate on a massive scale indexing millions of web pages to make the information searchable through user submitted queries. The goal of such a search system is to quickly identify those documents that are relevant to a user's query and return relevant search results. Properly configured neural networks have been demonstrated in a research environment to improve the relevancy of search results. However, because such approaches are computationally expensive and because of the massive scale and the need for low latency, use of neural networks in search systems have been limited to re-ranking of a limited set of search results outside of the research environment.

It is within this context that the present embodiments arise.

DETAILED DESCRIPTION

Figure 1:
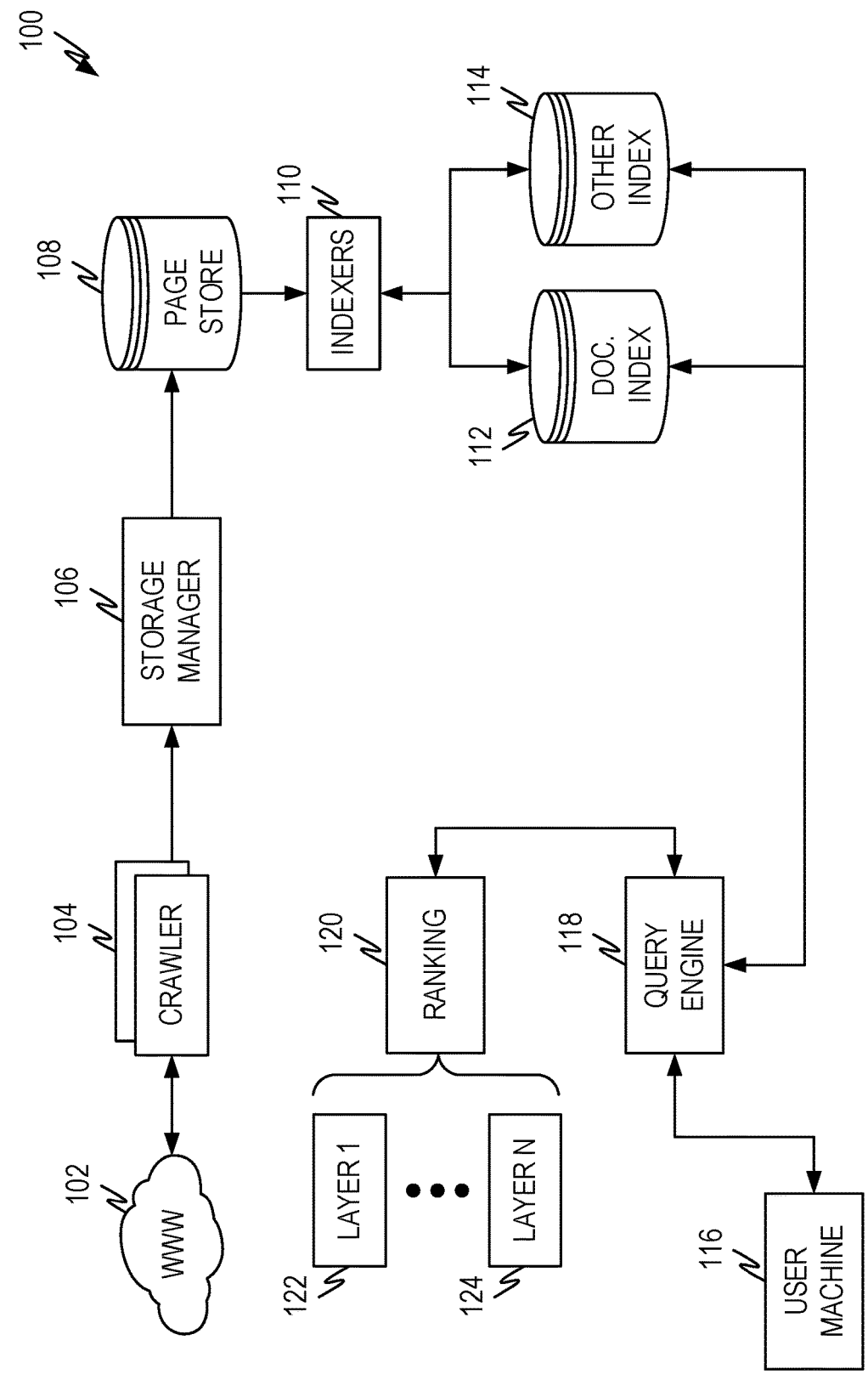
FIG. 1 illustrates an example of a prior art search system architecture.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

In a search system, machine learning based ranking models compare the whole query to each document in an entire document set to be searched and are, therefore, employed only for late stage re-ranking. Embodiments of the present disclosure can apply to a wide variety of systems whenever search systems retrieve documents based on a user query. Embodiments of the present disclosure employ machine learning models that operate under a query term independence construction. In the context of this disclosure, "query term" means any set of characters, such as a word, a sub-word, a byte string, and so forth. "Query term" is less than an entire query string. Each document in the set can thus be compared to independently and then the scores for the individual query terms can be combined in a weighted sum to arrive at the score for the entire query.

Because machine learning models that use the entire query (or combinations of n-grams from the query) uncover and utilize hidden relationships between the query terms, it was anticipated that although the approach disclosed in embodiments of the present disclosure would be more computationally efficient, they would also suffer degradation in ranking effectiveness as compared to machine learning models that use the entire query. However, experiments show that using the query term independence approach of the disclosed embodiments on state of the art deep learning based ranking models show minimal (or no) degradation in ranking effectiveness as compared to the entire query approach.

Furthermore, the query independence approach of the present disclosure allow offline pre-computation of all term-document scores using the deep learning ranking model. At search time, the final query-document score is computed by a linear sum of the pre-computed term-document scores. Furthermore, the pre-computed scores can be used in combination with an inverted index to perform very efficient retrieval from a web scale collection. To summarize, this allows deep learning models to be used for retrieval over large collections (e.g., web index).

Furthermore, the pre-computation of term-document scores allows deployment of deep learning search capability in computationally limited environments such as mobile or other client side devices. This opens up entirely new scenarios where state of the art ranking and retrieval models can be used in environments where they cannot currently be deployed. Thus, embodiments of the present disclosure have efficiency, storage, and privacy benefits over current approaches.

Description

Basic Search System Architecture

FIG. 1 illustrates an example 100 of a prior art search system architecture. The architecture of FIG. 1 is simplified in that it does not discuss all implementation details. However, it provides sufficient detail to allow the context for the present embodiments to be set and it covers the aspects pertinent to the present disclosure.

For web-scale search systems (e.g., search systems that search millions of documents), the system first extracts information about the documents to be searched and builds one or more indexes that can be searched against a user query to identify relevant documents. Thus, one or more crawlers 104 identify a set of documents that will represent the corpus over which search will be executed. The set of documents in a web search system are the documents residing on the internet 102. Thus, crawlers 104 crawl the web and extract information about the documents residing on the web. In this context, documents include any information accessible on the internet such as web pages, images, documents of other types, and/or so forth.

The extracted information is managed by a storage manager 106 which de-duplicates information and stores the information in one or more page stores 108. One or more indexers 110 create document indexes 112 and/or indexes for specific types of information 114 from the information in the page stores 108.

When a user submits a search query via a user machine 116, it is received by a query engine 118, which searches the indexes 112, 114 and identifies a set of documents that are relevant to the search query. The set of documents are ranked 120 and the set of final results are returned in response to the query to the user machine 116.

Documents are typically ranked through multiple layers of rankers 112, 124 in order to arrive at the ultimate set of search results that will be returned to the user. Multiple layers are utilized for computational efficiency. The first ranking layers 122 typically employ very computationally efficient approaches to quickly narrow the set of documents to those that are likely be relevant to the search query. The later ranking layers 124 typically employ more sophisticated but less computationally efficient approaches that are better able to distinguish relevant documents from non-relevant documents at a higher computational cost. Thus, the goal of the upper layers is to quickly narrow the set of documents under consideration while the goal of the lower layers is to identify the relative relevance of the individual documents.

Since deep learning approaches are computationally expensive, but better able to ascertain relative ranking, they are usually only employed in the later ranking stages of the system and are thus limited to reranking a set of data rather than initial document selection.

Although the above description has been made with reference to documents, search results often do not comprise documents themselves, but comprise links to where the documents can be located. However, embodiments of the present disclosure can return search results that comprise links to documents, the documents themselves, and/or combinations thereof. Thus, no distinction is made in this description between returning documents in the search result and returning links to the documents in the search results and returning documents shall include returning documents, links to documents, and combinations thereof.

Example Neural Network Architecture

Figure 2:
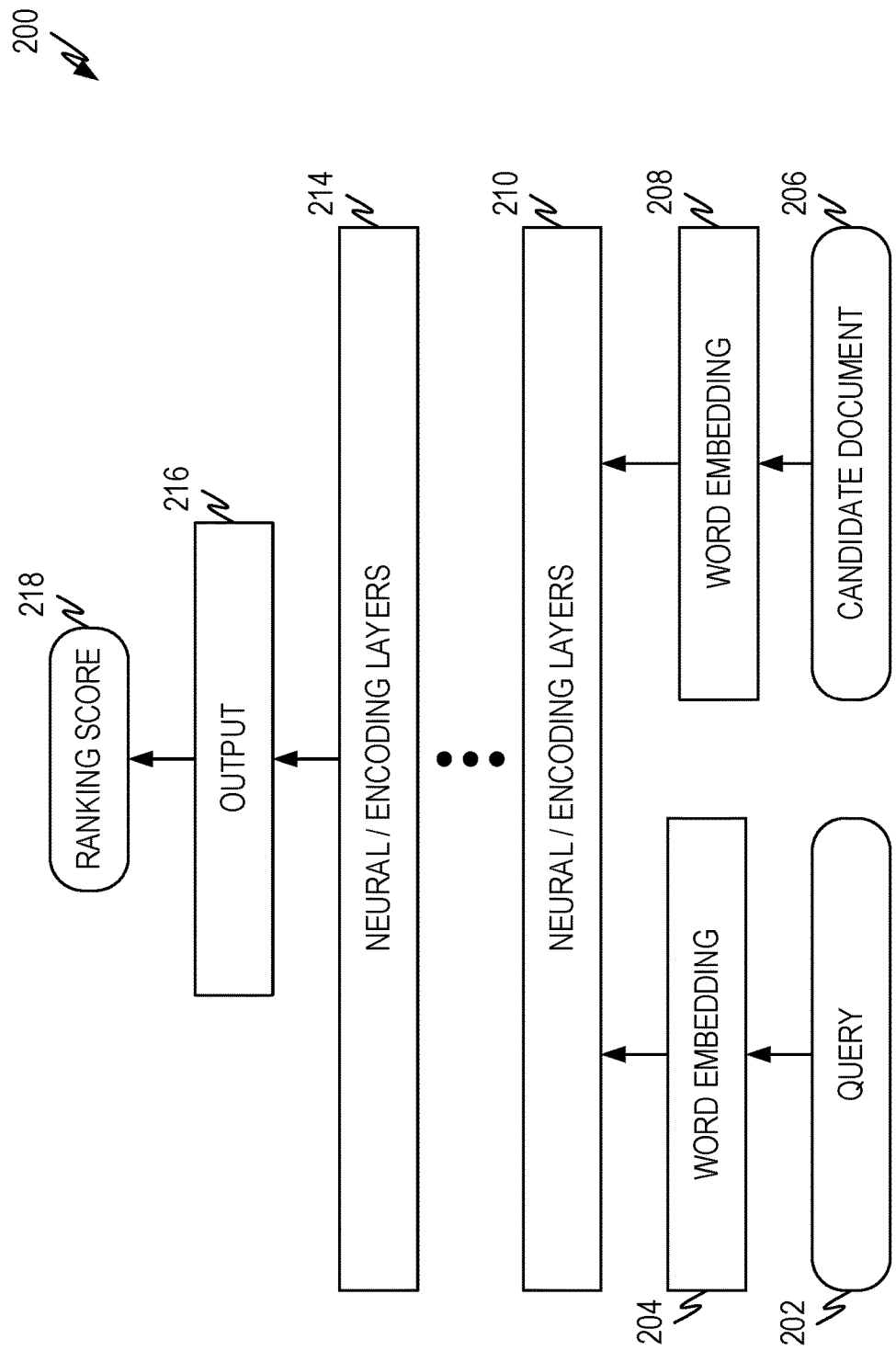
FIG. 2 illustrates an example of a prior art neural network.

FIG. 2 illustrates an example of a prior art neural network 200. The architecture is representative of a general architecture and not any specific architecture. Different deep learning model architectures have been developed and some are better at certain tasks than others. However, the general architecture of FIG. 2 is sufficient to illustrate principles relevant to the present disclosure.

Deep learning models in search systems compare an input query 202 to a candidate document 206 in order to produce a ranking score 218 for the candidate document 206 with respect to the input query 202. The deep learning models typically comprise an embedding layer 204, 208 which produce word embeddings for the input query 202 and/or candidate document 206. After the embedding layers are one or more neural network and/or encoding layers 210, 214. The neural network and/or encoding layers can comprise various types of layers, depending on the particular model architecture. These are the layers which, in a trained model, use and produce correlations of features of the input query 202 and/or candidate document 206 so that a ranking score 218 can be produced that accounts for the correlations. The model has one or more output layers 216 that produce the ranking score 218. Various output layers 216 can be used such as softmax, summation, sigmoid, and so forth, as known in the art.

As discussed herein, the neural network architectures for search have a couple of characteristics that have limited their usefulness in search systems. First, the computational burden to calculate ranking scores for large numbers of candidate documents makes them impractical to use for large-scale search and ranking problems. Thus, outside of research problems, neural network architectures have been limited to late stage search result reranking where the number of candidate documents under consideration is more limited.

Second, the entire premise of neural network architectures is to uncover "hidden" (e.g., unknown) correlations between features of the query and features of the candidate documents to identify documents that are more relevant to a search query and/or gain more accuracy in the ranking score. The training process adjusts the weights in the neural/encoding layers so that the features/correlations that are important to ranking score accuracy are emphasized and those that are not important are minimized. Thus, the instinct is that the more information that is presented to the neural network, the better the correlations can be uncovered and utilized. Thus, the instinct is that entire query strings are better input than only a few keywords when using neural network models to rank search documents.

Training Machine Learning Models

Figure 3:
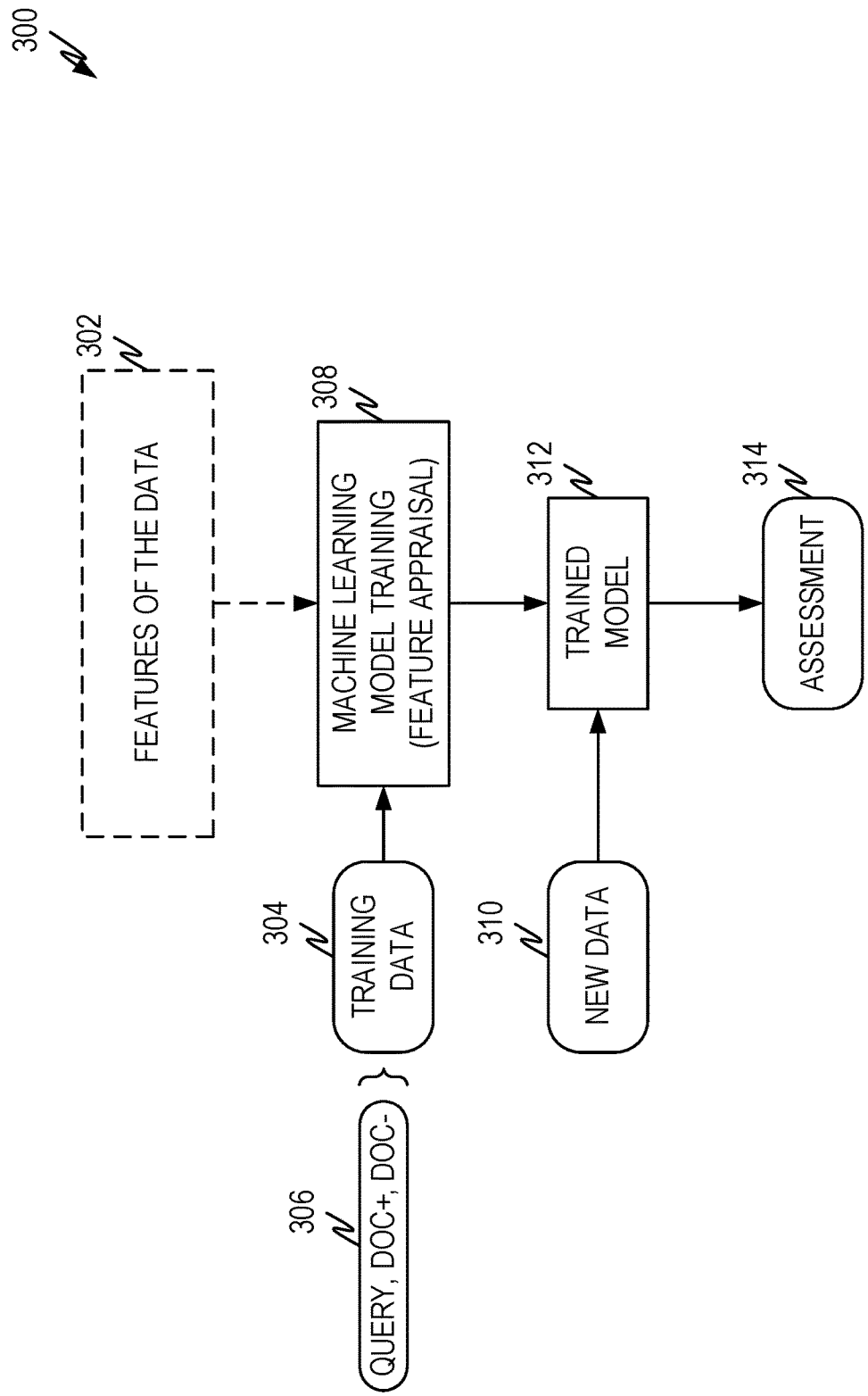
FIG. 3 illustrates an example prior art method used to train a neural network in a search system.

FIG. 3 illustrates an example prior art method 300 used to train a neural network in a search system. In this disclosure, the term "machine learning model" will be used to encompass neural networks, deep learning models, and other forms of learning models that are applicable to information retrieval such as document identification and ranking in the search systems described herein.

Machine-learning tools operate by adjusting weights and other parameters of a machine learning model using example training data 304 in order to make data-driven predictions or decisions expressed as outputs or assessments 314. Although example embodiments are presented with respect to a few machine-learning models, the principles presented herein may be applied to other machine-learning models.

Through the training process, the machine-learning models come to recognize correlations and interactions among features in the data 302 that lead to correct assessments 314 for the input data. A feature is an individual property of a phenomenon being observed. Features do not always correspond to easily identifiable aspects of the data, as some features in machine learning that are "discovered" by the machine learning model as important are a mix or amalgamation of the input data features.

The machine-learning algorithms utilize the training data 304 to find correlations among features of the data 302 that affect the outcome or assessment 314. In some example embodiments, the training data 304 includes labeled data, which identifies a correct outcome for the input data. In the context of search queries, training data comprises query-document "pairs" 306. Such query-document pairs often contain an example search query, a document that is relevant to the query (referred to as Doc+) and a document that is not relevant to the query (referred to as Doc−). The Doc+ is a positive example for the search query and the Doc− is a negative example for the search query. In the context of this disclosure, a query-document pair will refer to different combinations of a query and example documents. For example, a query-document pair can comprise a query and an associated Doc+. A query-document pair can also comprise a query and an associated Doc−. Finally, a query-document pair can comprise a query, an associated Doc+, and an associated Doc−.

The machine learning model is trained using the training data 304 via a training process 308. Training processes 308 are known in the art and adjust weights and other parameters of the machine learning model such that a loss function, which expresses errors that the model makes, is minimized with respect to the training data. The training process presents each of the query-document pairs to the machine learning model, evaluates the output assessment, compares it to the correct output, and adjusts the weights and other parameters of the model based on the comparison. The process is repeated for the training data set 304 so that the loss function is minimized. The result of the training is the trained machine-learning model 312.

When the machine-learning model 312 is used to perform an assessment, new data 310 (e.g., a new query and a documents to be evaluated with respect to the query) is provided as an input to the trained machine-learning model 312, and the trained machine-learning model 312 generates the assessment 314 as output. In this case the assessment 314 would be a ranking score for the document.

Query Term Independent Machine Learning Models

As noted above, modifying operation of machine learning models to utilize query term independence runs counter to conventional wisdom and practice. However, embodiments of the present disclosure utilize query term independent machine learning models. This leads to surprising and unexpected results as discussed herein.

Machine learning models used for ranking do not assume query term independence. Rather, they learn complex matching functions to compare the candidate documents to the full query as discussed above. The parameters of a traditional machine learning model, (I), are typically learned discriminatively as discussed above by minimizing a loss function of the form:

$$\mathcal{L} = \mathbb{E}_{q \sim \theta_q, d_+ \sim \theta_{d+}, d_- \sim \theta_{d-}}[\ell(\Delta_{q,d_+,d_-})] \quad (1)$$

where, $\Delta_{q,d_+,d_-} = \phi_{q,d_+} - \phi_{q,d_-}$ (2)

In these equations, q is the query, $d_+$ denotes a document relevant to the query (i.e., doc+), and $d_-$ denotes a document not relevant to the query (i.e., doc−). The loss, $\ell(\bullet)$, can take different forms such as a ranknet loss (discussed in Chris Burges, Tal Shaked, Erin Renshaw, Ari Lazier, Matt Deeds, Nicole Hamilton, and Greg Hullender, 2005, *Learning to Rank Using Gradient Descent*, in Proceedings of the 22nd international conference on Machine learning, pages 89-96, ACM, incorporated herein by reference), a hinge loss (discussed in Herbrich, Ralf & Graepel, Thore & Obermayer, Klaus, (2000), *Large Margin Rank Boundaries for Ordinal Regression*, Advances in Large Margin Classifiers, 88, incorporated herein by reference), or some other loss.

The ranknet loss is a log loss of the form:

$$\ell_{ranknet}(\Delta_{q,d_+,d_-}) = \log(1 + e^{-\sigma \cdot \Delta_{q,d_+,d_-}}) \quad (3)$$

where, $\Delta_{q,d_+,d_-} = \phi_{q,d_+} - \phi_{q,d_-}$ as given in equation (2) above and σ is a parameter of the loss function.

The hinge loss is a loss function of the form:

$$\ell_{hinge}(\Delta_{q,d_+,d_-}) = \max\{o, \in -\Delta_{q,d_+,d_-}\} \quad (4)$$

where, $\Delta_{q,d_+,d_-} = \phi_{q,d_+} - \phi_{q,d_-}$ as given in equation (2) above and ∈ is a parameter of the loss function.

Given a machine learning model, φ, a corresponding query term independent machine learning model is defined as:

$$\Phi_{q,d} = \Sigma_{t \in q} W_t \phi_{t,d} \quad (5)$$

where, t is a query term that exists in query, q.
  d is a document under consideration.
  $\phi_{t,d}$ is output of the machine learning model with input parameters t and d. This is the ranking score contribution factor for the term, t, regarding the document, d.
  $W_i$ is an optional weighting factor for the $i^{th}$ ranking score contribution factor.

The new model, Φ, can preserve the same architecture as the original model, φ but estimates the relevance of a document, d, independently with respect to each query term. However, although the new model can have the same architecture as the original model, often simplifications to the architecture can be made since the new model need only handle a single input term instead of an entire query phrase. If such simplifications are made, the computational burden of the new model can often be reduced over the original model.

The parameters of the new model, Φ, are learned with a modified loss function of the form:

$$\mathcal{L} = \mathbb{E}_{q \sim \theta_q, d_+ \sim \theta_{d+}, d_- \sim \theta_{d-}}[\mathcal{L}(\delta_{q,d_+,d_-})] \quad (6)$$

where, $\delta_{q,d_+,d_-} = \Sigma_{t \in q}(\phi_{t,d_+} - \phi_{t,d_-})$ (7)

The loss, $\mathcal{L}(\bullet)$, can take different forms such as a ranknet loss, a hinge loss, or some other loss.

The ranknet loss for the query independent model would take the form:

$$\mathcal{L}_{ranknet}(\delta_{q,d_+,d_-}) = \log(1 + e^{-\sigma \cdot \delta_{q,d_+,d_-}}) \quad (8)$$

where, $\delta_{q,d_+,d_-} = \Sigma_{t \in q}(\phi_{t,d_+} - \phi_{t,d_-})$ as given in equation (7) above and σ is a parameter of the loss function.

The hinge loss for the query independent model would take the form:

$$\mathcal{L}_{hinge}(\delta_{q,d_+,d_-}) = \max\{o, \in -\delta_{q,d_+,d_-}\} \quad (9)$$

where, $\delta_{q,d_+,d_-} = \Sigma_{t \in q}(\phi_{t,d_+} - \phi_{t,d_-})$ as given in equation (7) above and ∈ is a parameter of the loss function.

Given a collection (sometimes referred to as a corpus) of documents, C, and a vocabulary of query terms, V, the trained machine learning model can be used to precompute each of the ranking score contribution values, $\phi_{t,d}$, for all terms t∈V and documents d∈C. From these ranking contribution values, the query independent machine learning model for query, q, and document, d, can be calculated as a weighted sum of the ranking contribution values, as given in equation (5). In addition, the pre-computed ranking contribution values can be stored in an inverted index to perform retrieval from the full collection using the learned relevance function, Φ.

Several information retrieval data structures that can be used to store the pre-computed ranking contribution values, $\phi_{t,d}$, assume that the value of $\phi_{t,d}$ is always positive. Negative values can prevent proper functioning of these information retrieval data structures if they are employed in embodiments of the present disclosure. However, the formulations of the present disclosure do not ensure that the values of $\phi_{t,d}$ are always positive. In order to eliminate the possibility of negative values and ensure proper functioning of such data structures, a rectified linear unit, such as discussed in Xavier Glorot, Antoine Bordes, and Yoshua Bengio, 2011, *Deep Sparse Rectifier Neural Networks*, in Proceedings of the fourteenth international conference on artificial intelligence and statistics, pages 315-323 (incorporated herein by reference), as an activation function on the model's output can be used.

The ability to pre-calculate ranking contribution values, $\phi_{t,d}$, allows machine learning document selection and ranking to be utilized in computationally limited environments as described herein. This is a significant advantage of the present approach as one of the problems with taking advantage of state of the art machine learning approaches in large scale search systems or in computationally limited environments is the computational burden and associated latency in these applications. Embodiments of the present disclosure thus provide significant technical advantages over prior art approaches.

In practice, for large scale search environments, the total number of combinations of query terms, t, and documents, d, can be quite large. However, in such situations, embodiments of the present disclosure can enforce additional constraints on which <t, d> combinations to evaluate and simply assume no contributions from the remaining pairs. Basically, this means dropping particular term-document combinations <t, d>, dropping terms t, and/or dropping documents d, from vocabulary, V, and/or corpus, C, respectively, or both.

Dropping terms from consideration can be accomplished by dropping terms and/or term-document combinations that, for one reason or another, do not provide discriminatory effect such as by evaluating the term-frequency, inverse document frequency, or a combination thereof. Term-frequency and inverse document frequency are well known metrics. The term-frequency is a count of how often a term appears in a document. The inverse document frequency is a measure of how much information the term provides, i.e., if the term is rare or common across all documents. Several formulations of term frequency and inverse document frequency are known, and any can be used to help identify terms and/or documents to drop from consideration. For example, terms that exist in all (or almost all) documents have little discriminatory effect for ranking documents in terms of relevancy to a query containing that term. Thus, terms that have a high term-frequency value (e.g., above a threshold value) can be eliminated from consideration. Similarly, terms that are common as measured by inverse document frequency can be eliminated from consideration. This can again be measured by comparing the inverse document frequency values to a threshold and eliminating those terms that transgress the threshold.

Term frequency and inverse document frequency are often combined into a term frequency-inverse document frequency signal by multiplying the two metrics together. This signal can also be used to identify terms that are common and have little discriminatory effect in terms of ranking values for documents. Comparing the term frequency-inverse document frequency signal to a threshold and eliminating those that transgress the threshold can be used to eliminate terms from consideration.

There are also other mechanisms to eliminate term-document combinations, terms, and/or documents from consideration in order to constrain the number of combinations that are evaluated. Using words as a representative example of query terms, often words can have the same or similar meanings. Words with the same or similar meanings can be assigned the same query contribution score. In this sense, the words in a "cluster" of can be treated the same as far as query contribution scores and only one score need be computed and/or stored for an entire cluster. Such an approach effectively drops out query-terms from computation and/or storage. For example, a single query term can be used to compute the query contribution score for that term and then the score can be stored for all query terms in the cluster. As an alternative, the score can be stored for an entire cluster, such as by using a cluster identifier. An index can then be used to convert a query term into a cluster identifier and the query contribution score can be retrieved based on the cluster identifier.

There are several ways to identify words that have the same or similar meanings. For example, words in close proximity in an embedding space have similar meanings. Thus, a nearest neighbor algorithm can be used to group query terms into a cluster where all members of the cluster are assigned the same query contribution score. Other methods can be used to identify similarities between query terms such as dictionary-definition synonyms, ontological strategies like Word-Net which comprise graphs of relationships between words, and so forth.

In situations where query terms are not words, but are some other subset of a query string, similar strategies can be utilized.

Training Query Term Independent Machine Learning Models

Figure 4:
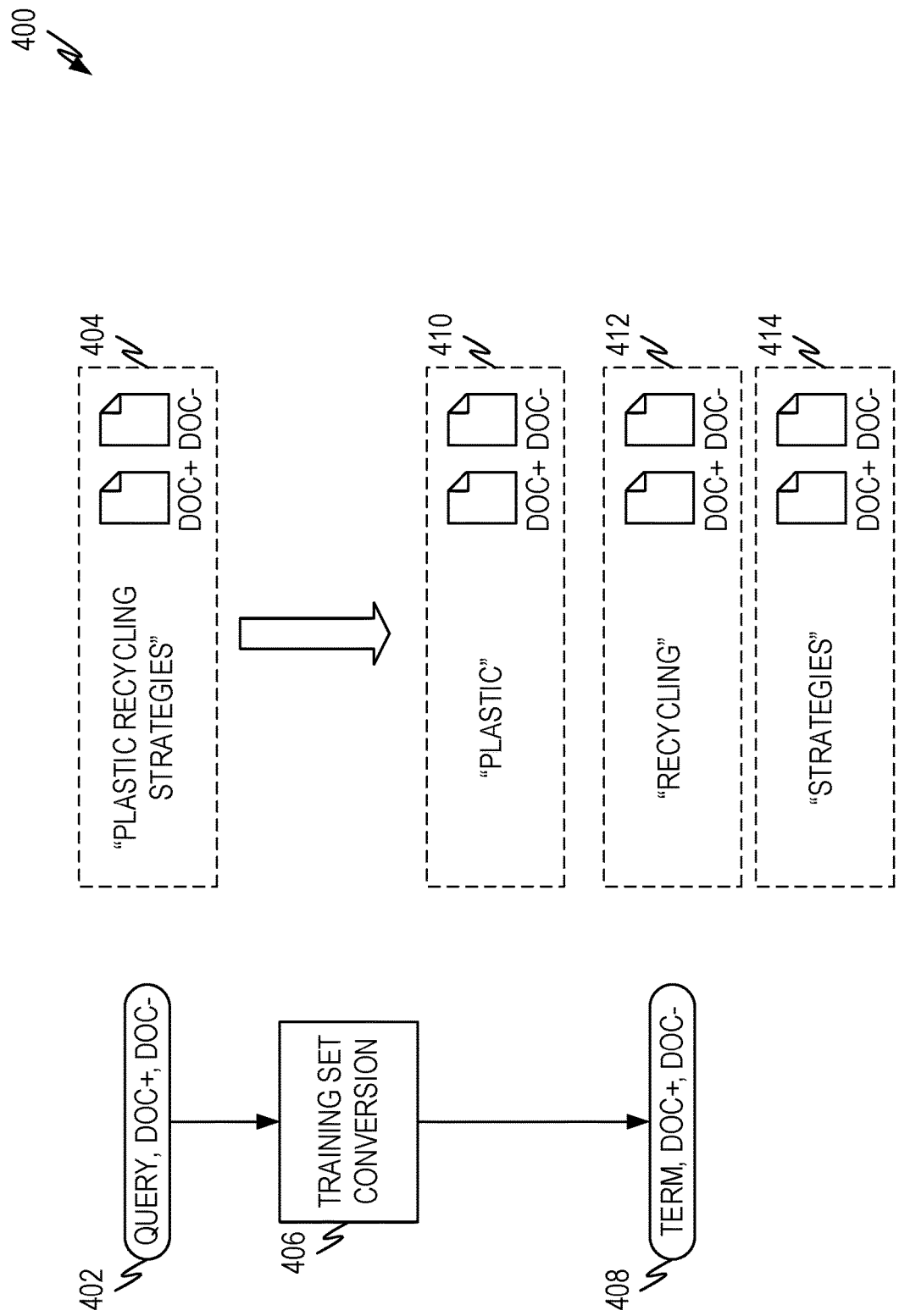
FIG. 4 illustrates an example method used to convert training data according to some aspects of the present disclosure.
Figure 5:
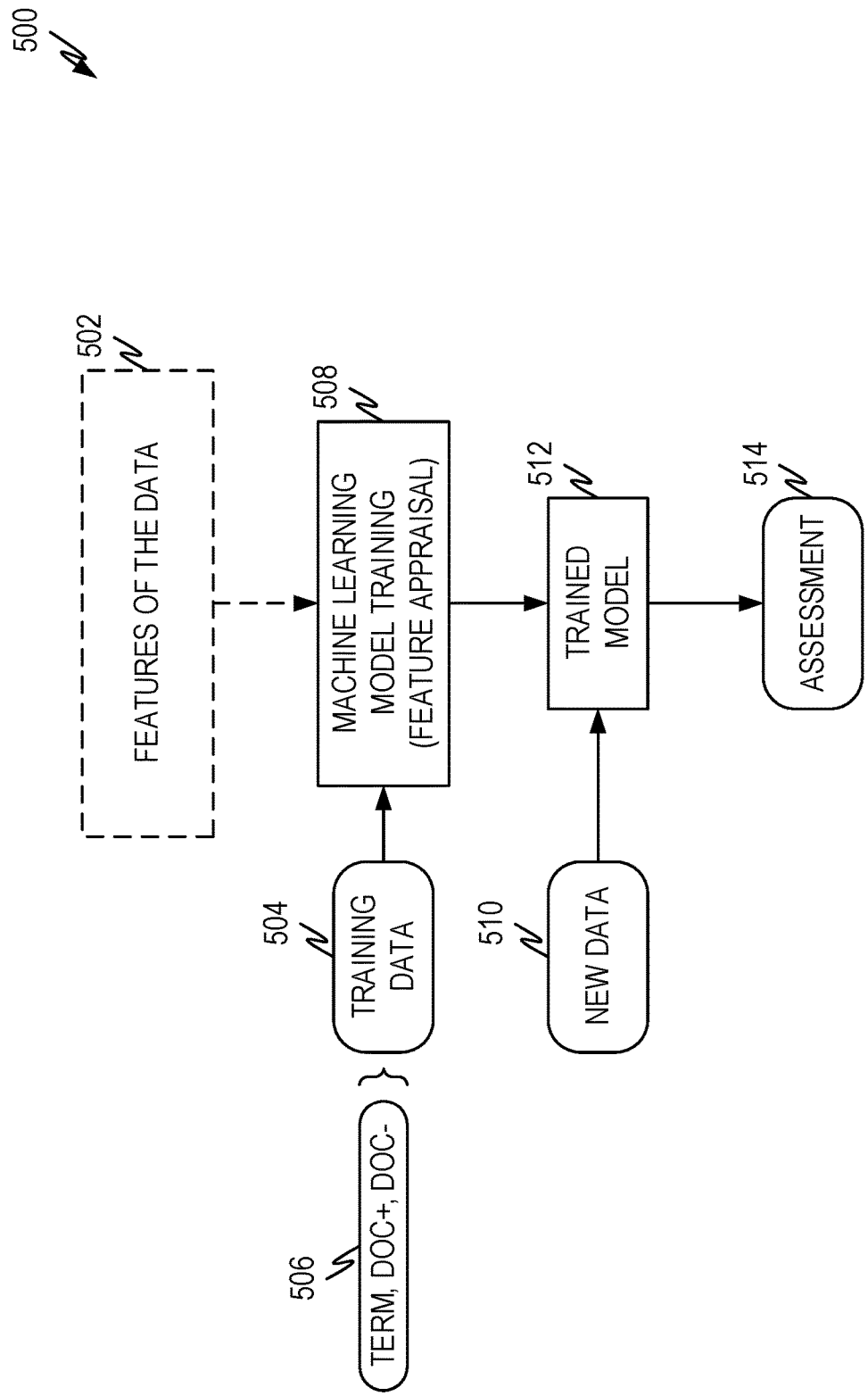
FIG. 5 illustrates an example method used to train machine learning models according to some aspects of the present disclosure.
Figure 6:
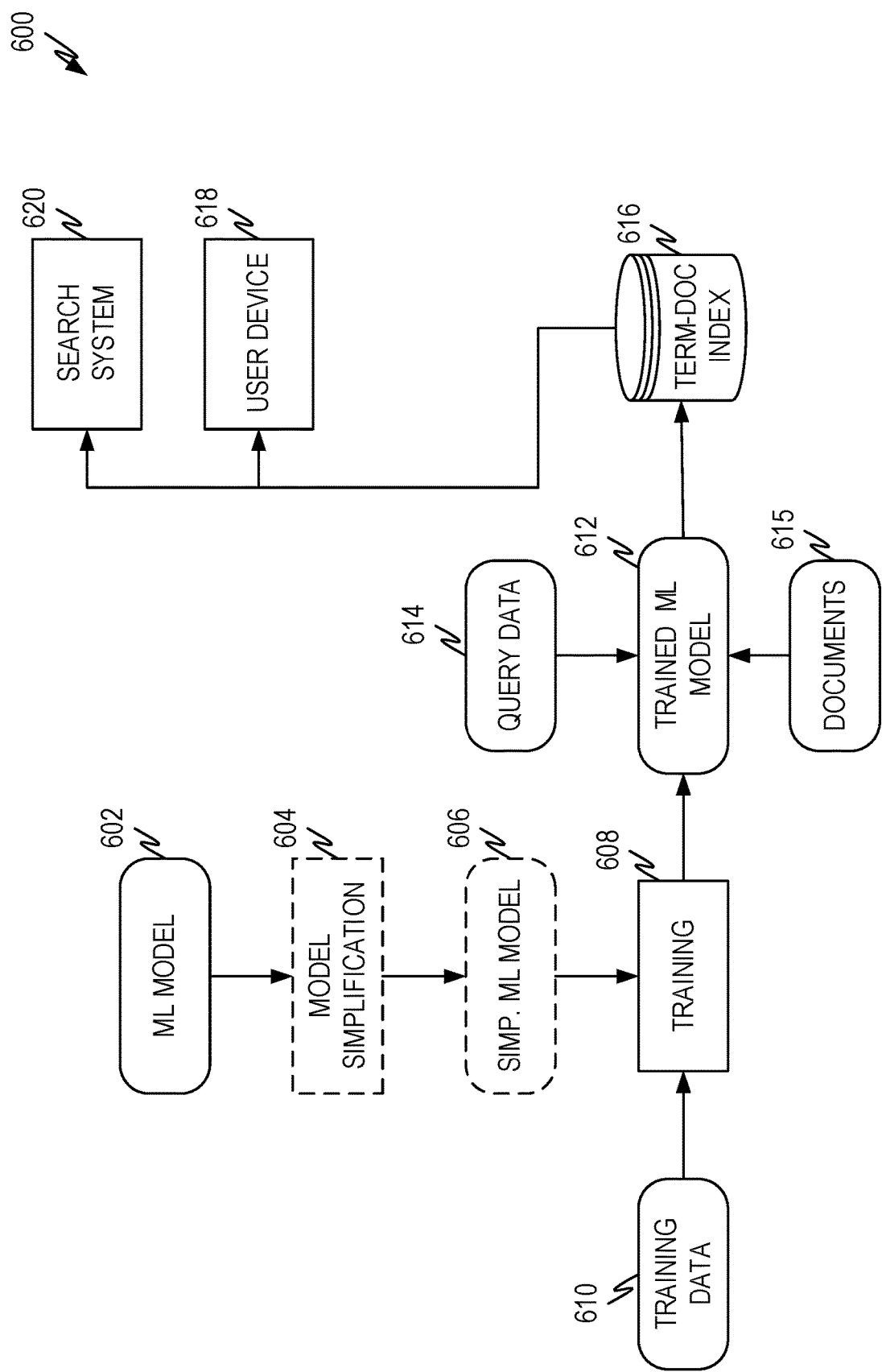
FIG. 6 illustrates an example diagram depicting pre-calculating term-document indexes according to some aspects of the present disclosure.

Turning now to FIGS. 4-6, a discussion of training query term independent machine learning models, $\Phi$, is presented.

As noted above, the query term independent machine learning models of the present disclosure are trained using query term-document pairs that include a query term, and one or both of a positive relevance document (doc+) example and/or a negative relevance document (doc−) example. One way to gather such training data is to convert training data that would be used to train the query phrase machine learning model into training data suitable for training the query term independent machine learning model. FIG. 4 illustrates one such example 400.

In this example a single entry of a query phrase-document 402 is converted into multiple query term-document 408 entries. This is done by a training conversion method 406. How method 406 operates is first retrieve the next query-document pair 402 in the training data set. The query portion of the query-document pair 402 is evaluated to identify all the query terms in the query phrase. How query terms are extracted depends on what the query terms are (e.g., the query term definition). For example, in the case where query terms are words, this can be done by looking for term break indicators such as a space or using other mechanisms to extract individual words from a phrase. Where query terms are subwords, character strings of a fixed length, or some other portion of a query string, other mechanisms are used. Extracting character strings of a fixed length is self-explanatory as the query is broken down into strings of a fixed length, padding where necessary. Where query terms are n-grams, known methods to divide a query string into n-grams can be used. Where query terms are divided by a character or symbol, the query string can be parsed and broken down into query terms based on the location of the character or symbol occurrences within the query string. Other methods can also be used, depending on the particular query term definition used.

Once the individual query terms have been extracted from the query phrase, any stop words or other terms that are to be eliminated from consideration (e.g., such as explained above) may be eliminated from the set of extracted query terms.

For each of the remaining query terms, each query term is paired with the example documents (e.g., doc+ and/or doc−) from the original query-document pair 402 to arrive at a number of query term-document pairs 408.

As an example, consider a query-document pair with the query "plastic recycling strategies" associated with a doc+ example and a doc− example, as indicated by query-document pair 404. In this situation the query would be analyzed and the query terms "plastic," "recycling," and "strategies" would be extracted.

Assuming an analysis of the query terms does not indicate that any of these terms should be dropped from consideration, the doc+ and doc− examples would be paired with each of the three query terms to yield the term-document pairs: {"plastic", doc+, doc−} 410, {"recycling", doc+, doc−} 412, {"strategies", doc+, doc−} 414. These three query term-document pairs would then be added to the set of training data for the query term independent machine learning model. If the original query-document pair contained a query and only an associated doc+ or doc−, the same strategy would be used, by pairing the query terms with the associated doc+ or doc−, as the case may be.

FIG. 5 illustrates an example method 500 used to train machine learning models according to some aspects of the present disclosure. This operates similar to the method previously discussed in conjunction with FIG. 3 with the exception of the loss function used to train the query term independent machine learning model in training process 508 and the actual training data 502 used by the training process 508 train the query term independent machine learning model. Additionally, or alternatively, the actual query term independent machine learning model that is used can be simplified to eliminate aspects not needed when only a single query term is used with the model, as described herein.

Stated another way, what turns a machine learning model into a trained query term independent machine learning model is: 1) optional simplification of the model to eliminate aspects that are not needed with a single input query term; 2) the training data used is query term-document pairs (instead of query-document pairs); and 3) the loss function used during training.

The optional model simplification is performed by eliminating aspects that are not needed when a single input query term is all that will be input. There is no general method for this to occur, but those of skill in the art will be able to perform this by analyzing the machine learning model architecture under the assumption of a single input term. What is eliminated, if anything, depends on the actual architecture of the machine learning model. Often, however, aspects that only consider combinations of terms can be eliminated outright. Neural network layers within the machine learning model can also often be simplified.

Obtaining proper query term-document pairs 506 for the training data 504 can be accomplished as described in FIG. 4, for example.

In another embodiment, the query term clustering approach described above can be utilized. For example, the machine learning model can be trained using query term cluster-document pairs. Using words as a representative example of query terms, often words can have the same or similar meanings. Words with the same or similar meanings can be grouped together in a cluster as described above in conjunction with reducing the number of query terms, documents, and/or query term-document pairs. The words in a cluster can be treated the same for training purposes. Thus, a query term can be checked for membership in a cluster. If the query term is a member of a cluster, one of two approaches may be taken. In a first approach a query term-document pair for each query term in the cluster is created by pairing each query term in the cluster with the doc+ and/or doc− associated with the query phrase. For example, if the query-document pair is {"elastic materials", doc+} and "elastic" belongs to a query term cluster with "pliable" "resilient" and "ductile," the resultant query term-document pairs would be: {"elastic", doc+}, {"pliable", doc+}, {"resilient", doc+}, {"ductile", doc+}, and {"materials", doc+}.

In a second approach, a single representative term for the cluster can be used in training any terms in the cluster. Thus, with the same query term cluster as above, if "elastic" is the representative term, the query-document pair {"ductile materials", doc−} would result in the query term-document pairs of: {"elastic", doc−} and {"materials", doc−}.

The loss function used by method 508 is given by equations (6) and (7) with equations (8) and (9) as specific examples as discussed above. With this loss function, the query term independent machine learning model is trained using methods that are well known in the art to minimize the selected loss function(s).

The trained machine learning model 512 can be used to calculate the ranking contribution value, $\phi_{t,d}$, for a given term, t, and document, d. Thus, the new data 510 is the term, t, and document, d, and an assessment 514 is the corresponding ranking contribution value, $\phi_{t,d}$.

With these changes the remainder of the figure operates, mutatis mutandis, as described in FIG. 3.

Pre-Calculated Term-Document Index

The ranking contribution value, $\phi_{t,d}$, for a given term, t, and document, d, can be pre-calculated and stored in a query term-document index. Aspects of this, including the use of inverted indexes for the query-term document index have been discussed to some extent above. FIG. 6 illustrates an example diagram 600 depicting pre-calculating term-document indexes according to some aspects of the present disclosure.

A machine learning model 602 is selected. The machine learning model can be any machine learning model that is designed to produce a ranking score given a document and an input query. Example state of the art deep learning models are discussed below in the section presenting the surprising test results achieved from embodiments of the present disclosure. However, any desired machine learning model can be utilized.

In optional operation 604 the selected machine learning model 602 can be simplified by analyzing the machine learning model 602 under the condition that only a single term will be input rather than the entire query phrase and eliminating and/or simplifying any aspects of the machine learning model 602 that are unnecessary. This process has been discussed above. The result of the operation 602 is a simplified machine learning model 606.

The machine learning model 602 or the simplified machine learning model 606, as the case may be, is then trained as discussed above in operation 608 using the training data 610. Also as discussed above, the training data 610 comprise query term-document pairs that include a query term, and an associated doc+ and/or an associated doc−. The training process, as discussed above, minimizes one or more selected query term independent losses.

The resultant trained machine learning model 612 can the be used to calculate the query term-document index 616 using a set of query terms 614 and a corpus of documents 615. A representative process is discussed in FIG. 7. This process calculates the ranking contribution value, $\phi_{t,d}$, for a given term, t, and document, d. The ranking contribution values, $\phi_{t,d}$, are stored in the query term-document index 616.

The query term-document index 616 can be sent to one or more systems for use in document selection and ranking. Because the query term is pre-calculated and document ranking scores are calculated from a weighted sum of ranking contribution values, the query term-document index 616 can be used in computationally limited contexts, such as user device 618. It can also be deployed as part of any search system 620.

Figure 7:
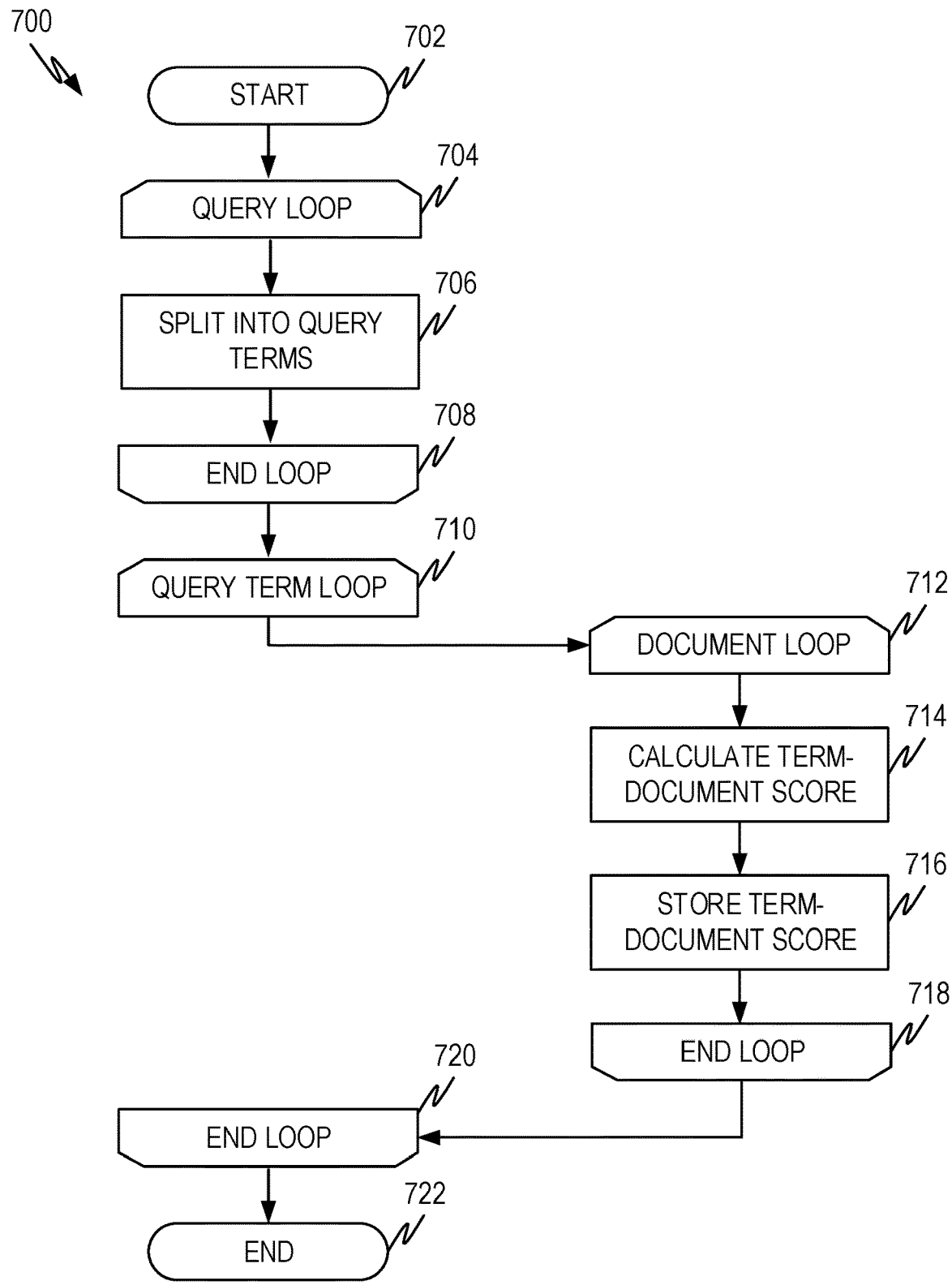
FIG. 7 illustrates an example flow diagram showing how a pre-calculated term-document is calculated according to some aspects of the present disclosure.

FIG. 7 illustrates an example flow diagram 700 showing how a pre-calculated term-document index is calculated according to some aspects of the present disclosure. The method begins at operation 702 and proceeds to an optional loop that begins at operation 704 and includes operation 706 and ends at operation 708. If the input into the process is a list of queries, rather than a set of individual query terms, the loop that begins at operation 704 loops over all the queries in the query set and extracts the individual query terms from the query and assembles a list of unique query terms (operation 706) so that the ranking contribution values, $\phi_{t,d}$, for the terms in the set of queries can be calculated.

If the input is a set of query terms, rather than a set of queries, the method 700 can begin at operation 710, which loops over all the query terms.

Operation 710 begins a loop which loops over all the terms in the set that are to be used for the query term-document index.

Operation 712 begins a loop over all the documents in the corpus for the query term under consideration.

Operation 714 calculates the ranking contribution values, $\phi_{t,d}$, for the query term and document combination for the current iteration of the loops. The ranking contribution values, $\phi_{t,d}$, are also referred to herein as the query term-document ranking score, or more simply, the term-document score.

Operation 716 stores the ranking contribution values, $\phi_{t,d}$, in the term-document index.

Operations 718, and 720 close the corresponding loops to select the next document, query term, and query, respectively.

The method ends at operations 722.

As a representative example of how this works, consider a set of three queries (q1 . . . q3):
(1) "plastic recycling strategies"
(2) "trash recycling options"
(3) "sorting trash for recycling"
and a corpus of n documents, D1 . . . Dn.

The loop starting at operation 704 will loop through the three queries q1 . . . q3 and extract the unique query terms. In this case the list of unique query terms are in the first column of Table 1.

TABLE 1

Term-Document Scores

| | D1 | D2 | ... | Dn |
|---|---|---|---|---|
| plastic | | | | |
| recycling | | | | |
| strategies | | | | |
| trash | | | | |
| options | | | | |
| sorting | | | | |

The loop starting at 708 will loop over each term in the queries. The loop starting at 710 will loop over all the documents, D1 . . . Dn. Operation 714 calculates the term-document scores and operation 716 stores the scores in the index. Assuming that $S_{t,d}$ is the score for term, t, and document d, after the method finishes table 1 will look like table 2.

TABLE 2

Term-Document Scores

| | D1 | D2 | ... | Dn |
|---|---|---|---|---|
| plastic | $S_{1,1}$ | $S_{1,2}$ | ... | $S_{1,n}$ |
| recycling | $S_{2,1}$ | $S_{2,2}$ | ... | $S_{2,n}$ |
| strategies | $S_{3,1}$ | $S_{3,2}$ | ... | $S_{3,n}$ |
| trash | $S_{4,1}$ | $S_{4,2}$ | ... | $S_{4,n}$ |
| options | $S_{5,1}$ | $S_{5,2}$ | ... | $S_{5,n}$ |
| sorting | $S_{6,1}$ | $S_{6,2}$ | ... | $S_{6,n}$ |

The individual scores, $S_{t,d}$, are the ranking contribution values, $\phi_{t,d}$, calculated using the trained query term independent machine learning model (e.g., 512, 612).

Using Machine Learning to Select and Rank Documents

Figure 8:
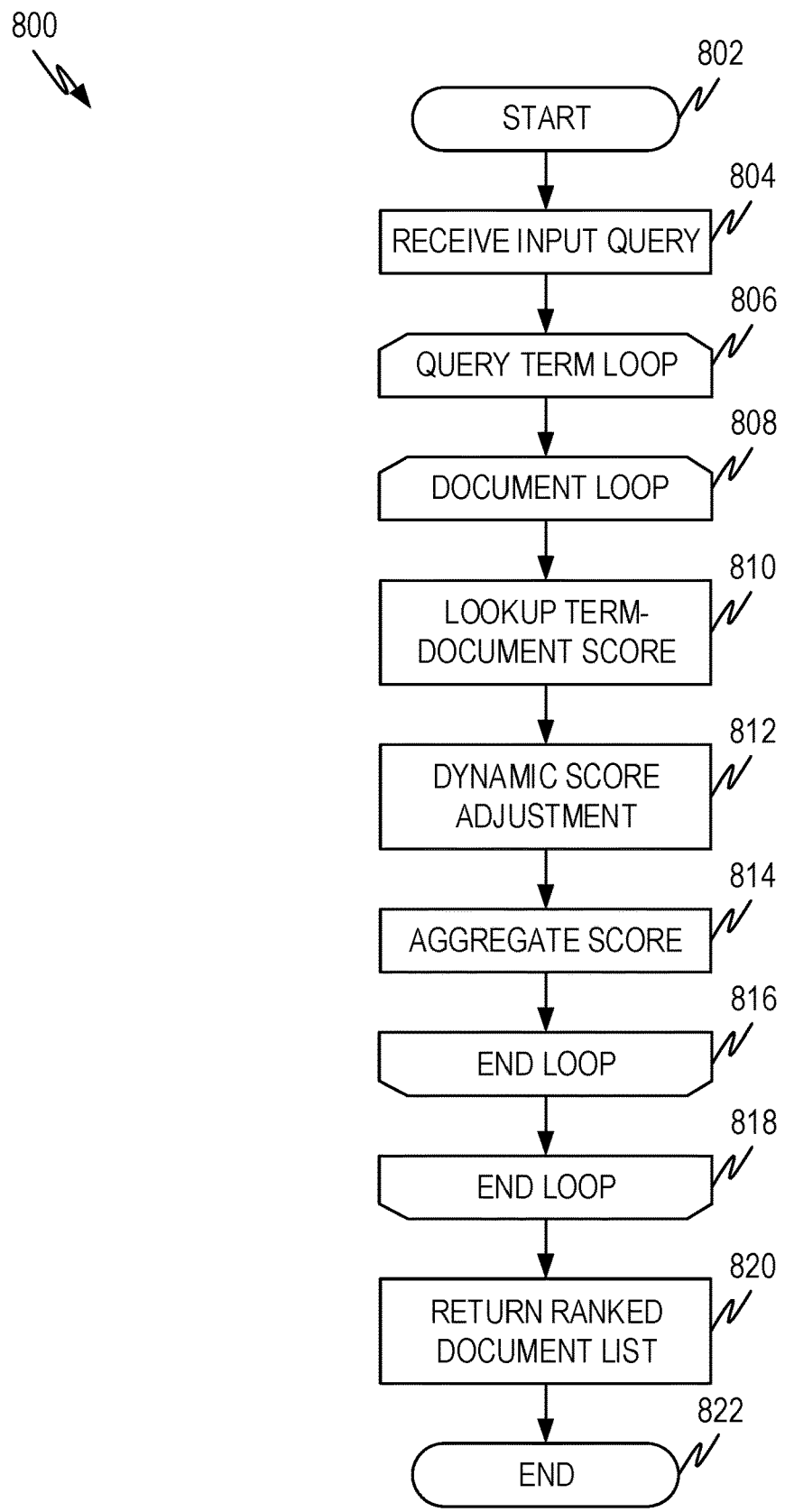
FIG. 8 illustrates an example flow diagram showing use of a pre-calculated term-document score to calculate document ranking according to some aspects of the present disclosure.

FIG. 8 illustrates an example flow diagram 800 showing use of a pre-calculated term-document score to calculate document ranking according to some aspects of the present disclosure. Table 2 above will be used as an example of the pre-calculated query-term index and scores therein for purposes of illustration. Additionally, the sample query "sorting plastic prior to recycling" will be used as a sample query.

The method begins at operation 802 and proceeds to operation 804 where the query is received. In the example used herein, the query is "sorting plastic prior to recycling."

Operation 806 begins a loop over each document in the corpus. In our example, D1 . . . Dn.

Operation 808 begins a loop over each term in the query. For our sample query, discarding the stop word "to," the loop beginning at operation 808 will loop once for the terms, "sorting," "plastic," "prior," and "recycling."

The document loop and query term loop can be performed in any order. However, if the document is the outer loop, the score aggregation operation 814 can easily aggregate the scores for each document as explained below.

Operation 810 looks up the corresponding score in the term-document index for the query term and document under consideration. The first time through both the loop beginning at operation 806 and operation 808, the document under consideration will be D1 and the term under consideration will be "sorting". The corresponding score from Table 2 is $S_{6,1}$.

Operation 812 represents an optional weighting factor for the term and/or document. In some embodiments, it may be desirable to adjust the weighting factor based on knowledge that is currently known but was not known at the time the scores were precalculated. For example, the importance of certain words can become apparent by observing user behavior over time. Suppose a user enters the following queries in sequence:

(1) "sorting plastic"
(2) "plastic sorting machines for recycling"
(3) "sorting plastic prior to recycling"

Further suppose that after the first two queries, the user did not find what they were looking for (e.g., as determined by the user running the next query without looking at the search results of the prior query). It can be postulated that the new terms in the current query hold more importance than the terms that repeatedly appear in the prior queries. In such a situation, it may be desirable to give the new terms more weight than the repeated terms. Similarly, perhaps some words are not very discriminative in some contexts, but are more discriminative in others. The context can then be used to identify which terms should be given more weight and/or less weight given the context.

Operation 814 aggregates the scores for the document for the current term.

The loops end in operations 816 and 818. After the loop that ends in operation 816, the aggregate score for the document under consideration will be known. Using our example query, and assuming no adjustment in the scores by operation 812, the aggregate scores will be as shown in Table 3.

TABLE 3

Aggregate Document Scores

| Query Terms | D1 | D2 | ... Dn |
|---|---|---|---|
| sorting | $S_{6,1}$ | $S_{6,2}$ | ... $S_{6,n}$ |
| plastic | $S_{1,1}$ | $S_{1,2}$ | ... $S_{1,n}$ |
| prior | 0 | 0 | ... 0 |
| recycling | $S_{2,1}$ | $S_{2,2}$ | ... $S_{2,n}$ |
| Aggregate Score | $S_{6,1} + S_{1,1} + S_{2,1}$ | $S_{6,2} + S_{1,2} + S_{2,2}$ | ... $S_{6,n} + S_{1,n} + S_{2,n}$ |

Operation 820 can rank the documents by aggregate score and return a subset of the documents as the ranked set of documents. The subset can be determined by a selection criteria based, at least in part, on the aggregate scores. Thus, the documents corresponding to the top N documents may be selected and returned. In this context, a subset is all or less than all of the documents.

Test Results

In order to test the performance of embodiments of the present disclosure, a known set of passage ranking data was selected and state of the art deep neural network models were adjusted and trained according to the methods as described herein. The performance of the models used in the query term independence way of the present disclosure and the performance of the models used in the traditional way were compared. In making this comparison, it was anticipated that the models used in traditional way would outperform the models used in the query term independent way of the present disclosure in terms of ranking and selection accuracy, but that the models used in the query term independent way presented in the present disclosure would outperform the models used in the traditional way in terms of computational efficiency. In other words, the approach taken by the present disclosure was anticipated to be more efficient from a computational standpoint but be less effective from an accuracy standpoint. Surprisingly, there is little to no statistical significance between the accuracy of embodiments in the present disclosure and the prior art deep learning approach. Additionally, the pre-calculated term-document index held a significant computational edge over the prior art deep learning approach. Thus, the test data shows that there was no tradeoff in terms of accuracy to gain the computational efficiency as expected.

The tests used the MS MARCO dataset described in Payal Bajaj, Daniel Campos, Nick Craswell, Li Deng, Jianfeng Gao, Xiaodong Liu, Rangan Majumder, Andrew McNamara, Bhaskar Mitra, Tri Nguyen, et al, 2016, MS MARCO: A Human Generated Machine Reading Comprehension Dataset, arXiv:1611.09268v3 [cs.CL]. As of this writing, the dataset is available at http://www.msmarco.org. The dataset includes over one million queries drawn from Bing's® search logs, 8.8 million passages extracted from web documents, and 400,000 positively labeled query-passage pairs for training and is one of the few large datasets available today for benchmarking deep neural information retrieval methods.

The MS MARCO dataset contains a passage ranking task comprising one thousand passages per query that the information retrieval model being evaluated should re-rank. Corresponding to every query, one or few passages have been annotated by human editors as containing the answer relevant to the query. The rank list produced by the model is evaluated using the mean reciprocal rank (MMR) metric against ground truth annotations. The MS MARCO training dataset was used to train all models used in the tests.

The dataset also includes a leaderboard (with 18 entries as of 3 Mar. 2019) which can be a useful catalog of approaches that show state-of-the-art performance on information retrieval. In other words, the leaderboard allows the approaches with the highest accuracy on the dataset to be adopted for comparison against the embodiments of the present disclosure.

The tests compared three different top-performing deep learning neural network approaches to information retrieval. These three models are BERT, Duet, and CKNRM and are described in greater detail below.

BERT achieves state of the art performance on the MS MARCO dataset as described in Rodrigo Nogueira and Kyunghyun Cho, Passage Re-Ranking with BERT, arXiv: 1901.04085v2 [cs.IR]. The authors report retrieval performance based on fine tuning of both pre-trained BERT Base and BERT Large models on the MS MARCO dataset. The tests conducted used the BERT Base model.

The Duet model estimates the relevance of a document to a query by a combination of (1) examining the patterns of exact matches of query terms in the document, and (2) computing similarity between learned latent representations of query and document. The Duet model is described in Bhaskar Mitra, Fernando Diaz, and Nick Craswell, 2017, *Learning to Match Using Local and Distributed Representations of Text for Web Search*, in Proc. WWW, pages 1291-1299. The version of Duet that produced results on the MS MARCO leaderboard has modifications from the original Duet of the paper above. The modifications can be found as of this writing at https://github.com/dfcf93/MSMARCO/blob/master/Ranking/Baselines/Duet.ipynb. This version of Duet was used for comparison purposes.

The CKNRM model combines kernel pooling based soft matching with a convolutional architecture for comparing n-grams. CKNRM uses kernel pooling to extract ranking signals from interaction matrices of query and passage unigrams, bigrams, and trigrams. The public implementation of this model found as of this writing at https://github.com/thunlp/Kernel-Based-Neural-Ranking-Models was used for comparison purposes.

Table 4 below compares the three models in their original configurations (i.e., using the full query) and as query term independent models trained and utilized as specified herein.

TABLE 4

Ranking Effectiveness Comparison

| Model | Mean | MRR@10 (±std. deviation) | Median |
|---|---|---|---|
| BERT | | | |
| Full | 0.356 | | 0.356 |
| Term Ind. | 0.333 | | 0.333 |
| Duet | | | |
| Full | 0.239 | ±0.002 | 0.240 |
| Term Ind. | 0.244 | ±0.002 | 0.244 |
| CKNRM | | | |
| Full | 0.223 | ±0.004 | 0.224 |
| Term Ind. | 0.222 | ±0.005 | 0.221 |
| BM25 | 0.167 | | 0.167 |

In Table 4, the "Full" represents the model trained and utilized in the prior art manner (i.e., with the full query). "Term Ind." represents the model trained and utilized as described in the embodiments of the present disclosure (i.e., in a query term independent manner as described herein). The BM25 is a non-machine learning method of ranking search results that uses a query term independent assumption and is well known in the art. It is presented here as a comparison to the machine learning approaches.

The Duet and CKNRM based models were trained five and eight times respectively, using different random seeds for model parameters. Table 4 reports, the mean and median MRR. For the BERT based models, a single training and evaluation run was made. As noted in the table, there is little or no statistically significant difference in effectiveness when using the models in embodiments of the present disclosure, as compared to using the models on the entire query phrase. The BERT model did show a statistically significant difference in the single run, but it is unknown at this point how the statistics for multiple training runs would work out. As noted herein this is a surprising result and was unexpected given the nature and purpose of the machine learning models. This means that embodiments of the present disclosure loose little or no accuracy but gain computational efficiency.

Table 5 below shows the results of a smaller scale retrieval experiment based on a random sample of 395 queries from the test set. The Duet model was chosen for evaluation and was utilized in the query independent way of the embodiments described herein to pre-compute the ranking contribution values, $\phi_{t,d}$, (e.g., pre-computed term-document index) for selected query terms. In order to constrain the dimensionality of the term-document index, ranking contribution values were only computed for those terms that 1) appeared at least once in the document, and 2) did not appear in more than 5% of the documents in the document collection. In the table, the BM25 model, the BM25 model (for initial selection) with Duet as a final re-ranker, and the query term independent Duet model.

TABLE 5

Retrieval Results

| Model | Recall@1000 | MRR@10 |
|---|---|---|
| BM25 | 0.80 | 0.169 |
| BM25 + Duet | 0.80 | 0.212 |
| Duet (term ind.) | 0.85 | 0.218 |

As noted there is a 6.25% improvement in recall@1000 from the term independent Duet as compared to BM25 and BM25+Duet. This is a statistically significant improvement. It would be computationally infeasible to use the full Duet model in the test above because the full Duet model would have to be run against every query and document combination.

Example Machine Architecture and Machine-Readable Medium

Figure 9:
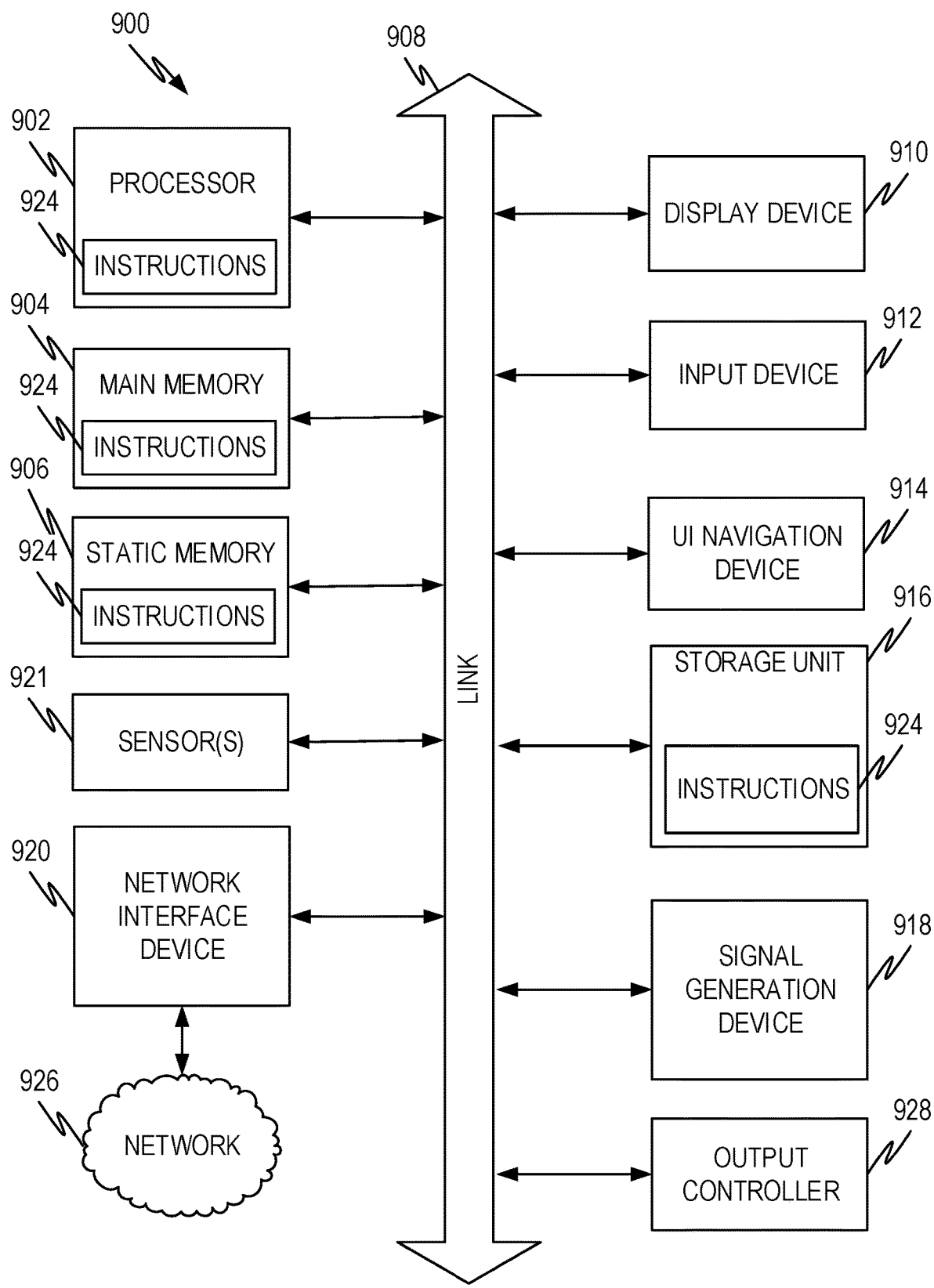
FIG. 9 illustrates a representative architecture for implementing the systems and other aspects disclosed herein or for executing the methods disclosed herein.

FIG. 9 illustrates a representative machine architecture suitable for implementing the systems and so forth or for executing the methods disclosed herein. The machine of FIG. 9 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 9 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 900 includes at least one processor 902 (e.g., a central processing unit (CPU), a graphics processing unit (GPU), advanced processing unit (APU), or combinations thereof), one or more memories such as a main memory 904, a static memory 906, or other types of memory, which communicate with each other via link 908. Link 908 may be a bus or other type of connection channel. The machine 900 may include further optional aspects such as a graphics display unit 910 comprising any type of display. The machine 900 may also include other optional aspects such as an alphanumeric input device 912 (e.g., a keyboard, touch screen, and so forth), a user interface (UI) navigation device 914 (e.g., a mouse, trackball, touch device, and so forth), a storage unit 916 (e.g., disk drive or other storage device(s)), a signal generation device 918 (e.g., a speaker), sensor(s) 921 (e.g., global positioning sensor, accelerometer(s), microphone(s), camera(s), and so forth), output controller 928 (e.g., wired or wireless connection to connect and/or communicate with one or more other devices such as a universal serial bus (USB), near field communication (NFC), infrared (IR), serial/parallel bus, etc.), and a network interface device 920 (e.g., wired and/or wireless) to connect to and/or communicate over one or more networks 926.

Executable Instructions and Machine-Storage Medium

The various memories (i.e., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for information retrieval, comprising:
providing access to a pre-calculated term-document index, each ranking score in the pre-calculated term-document index being provided by a machine learning model trained using a set of training data comprising query term-document pairs;
receiving a query;
splitting the query into its constituent query terms;
for each constituent query term:
retrieving a corresponding ranking score for each document in a set of documents based on the constituent query term from the pre-calculated term-document index; and
aggregating the ranking score for the constituent query term by document;
ranking the set of documents by corresponding aggregated ranking score;
selecting a subset of the ranked set of documents as a set of search results; and
returning the set of search results in response to the query.

Example 2

The method of example 1 wherein the pre-calculated term-document index is created using a method comprising:
identifying a set of queries;
for each query in the set of queries:
split a query under consideration into its constituent query terms; and
for each constituent query term:
calculate the ranking score for each document in the set of documents using the trained machine learning model; and
store the ranking score in the pre-calculated term-document index.

Example 3

The method of example 1 wherein the pre-calculated term-document index is created using a method comprising:
identifying a set of queries;
splitting each set of queries into its constituent query terms to form a set of query terms;
select a subset of query terms from the set of query terms;
select a subset of documents in the set of documents;
for each query term in the subset of query terms:
calculate the ranking score for each document in the subset of documents using the trained machine learning model; and
store the ranking score in the pre-calculated term-document index.

Example 4

The method of example 1, 2, or 3 wherein the pre-calculated term-document index is received from another system.

Example 5

The method of example 1, 2, 3, or 4 wherein the pre-calculated term-document index is calculated on the system executing the method.

Example 6

The method of example 1, 2, 3, 4, or 5 wherein the machine learning model is trained using a method comprising:
identifying first training data comprising a set of query-document pairs;
splitting each query-document pair into a set of query term-document pairs thereby creating second training data;
identifying a query term independent loss function;
training the machine learning model by minimizing the query term independent loss function against the second training data.

Example 7

The method of example 6 wherein the query term independent loss function is a weighted sum of term-document scores.

Example 8

The method of example 6 wherein the query term independent loss function is a function of a weighted sum of the difference of term-document scores for positive document examples and term-document scores for negative document examples.

Example 9

The method of example 1, 2, 3, 4, 5, 6, 7, or 8 wherein each term-document pair comprises:
a query term from a query-document pair; and
one of either a positive document example from the query-document pair or a negative document example from the query-document pair.

Example 10

The method of example 1, 2, 3, 4, 5, 6, 7, or 8 wherein each term-document pair comprises:
a query term from a query-document pair;
a positive document example from the query-document pair; and
a negative document example from the query-document pair.

Example 11

The method of example 1, 2, 3, 4, 5, 6, 7, 8, 9, or 10 further comprising selecting the set of documents from a larger set of documents, such that the set of documents is a subset of the larger set of documents.

Example 12

The method of example 1, 2, 3, 4, 5, 6, 7, 8, 9, 10, or 11 further comprising:
dynamically selecting a weight for the ranking score for the constituent query term; and
wherein the aggregation comprises weighting the ranking score for the constituent query term by the dynamically selected weight.

Example 13

The method of example 12 wherein the dynamically selected weight is selected based on a context of the query phrase.

Example 14

An apparatus comprising means to perform a method as in any preceding example.

Example 15

Machine-readable storage including machine-readable instructions, when executed, to implement a method or realize an apparatus as in any preceding example.

Example 16

A method for information retrieval, comprising:
providing access to a pre-calculated term-document index, each ranking score in the pre-calculated term-document index being provided by a machine learning model trained using a set of training data comprising query term-document pairs;
receiving a query;
splitting the query into its constituent query terms;
for each constituent query term:
retrieving a corresponding ranking score for each document in a set of documents based on the constituent query term from the pre-calculated term-document index; and
aggregating the ranking score for the constituent query term by document;
ranking the set of documents by corresponding aggregated ranking score;
selecting a subset of the ranked set of documents as a set of search results; and
returning the set of search results in response to the query.

Example 17

The method of example 16 wherein the pre-calculated term-document index is created using a method comprising:
identifying a set of queries;
for each query in the set of queries:
split a query under consideration into its constituent query terms; and
for each constituent query term:
calculate the ranking score for each document in the set of documents using the trained machine learning model; and
store the ranking score in the pre-calculated term-document index.

Example 18

The method of example 16 wherein the pre-calculated term-document index is received from another system.

Example 19

The method of example 16 wherein the pre-calculated term-document index is calculated on the system executing the method.

Example 20

The method of example 16 wherein the machine learning model is trained using a method comprising:
identifying first training data comprising a set of query-document pairs;
splitting each query-document pair into a set of query term-document pairs thereby creating second training data;
identifying a query term independent loss function;
training the machine learning model by minimizing the query term independent loss function against the second training data.

Example 21

The method of example 20 wherein the query term independent loss function is a weighted sum of term-document scores.

Example 22

The method of example 20 wherein the query term independent loss function is a function of a weighted sum of the difference of term-document scores for positive document examples and term-document scores for negative document examples.

Example 23

The method of example 20 wherein each term-document pair comprises:
a query term from a query-document pair; and
one of either a positive document example from the query-document pair or a negative document example from the query-document pair.

Example 24

The method of example 20 wherein each term-document pair comprises:
a query term from a query-document pair;
a positive document example from the query-document pair; and
a negative document example from the query-document pair.

Example 25

The method of example 16 further comprising selecting the set of documents from a larger set of documents, such that the set of documents is a subset of the larger set of documents.

Example 26

The method of example 16 further comprising:
dynamically selecting a weight for the ranking score for the constituent query term.

Example 27

A system comprising a processor and computer executable instructions, that when executed by the processor, cause the system to perform operations comprising:
create a pre-calculated term-document index with operations comprising:
identify a set of query terms;
provide access to a machine learning model trained using a set of training data comprising query term-document pairs;
for each query term in the set of query terms:
calculate a ranking score for each document in a set of documents using a trained machine learning model; and
store the ranking score in the pre-calculated term-document index;
select a set of query results with operations comprising:
receive a query;
split the query into its constituent query terms;
for each constituent query term:
retrieve a corresponding ranking score for each document in the set of documents based on the constituent query term from the pre-calculated term-document index; and
aggregate the corresponding ranking score for the constituent query term by document;
rank the set of documents by corresponding aggregated ranking score;
select a subset of the ranked set of documents as the set of query results; and
return the set of search results in response to the query.

Example 28

The system of example 27 further comprising select the set of documents from a larger set of documents, such that the set of documents is a subset of the larger set of documents.

Example 29

The system of example 27 further comprising train the machine learning model using operations comprising:
identify first training data comprising a set of query-document pairs;
split each query-document pair into a set of query term-document pairs thereby creating second training data;
identify a query term independent loss function;
train the machine learning model by minimizing the query term independent loss function against the second training data.

Example 30

The system of example 29 wherein the query term independent loss function is a function of a weighted sum of term-document scores.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A method for information retrieval, comprising:
receiving a query that comprises a first term and a second term;
identifying a document based upon the query;
subsequent to identifying the document, retrieving a first ranking score from an index based upon the first term and the document, wherein the first ranking score was previously output by a computer-implemented neural network based upon the first term and the document;
retrieving a second ranking score from the index based upon the second term and the document, wherein the second ranking score was previously output by the computer-implemented neural network based upon the second term and the document;
computing an overall ranking score for the document with respect to the query, wherein the overall ranking score is based upon an aggregate of the first ranking score and the second ranking score; and
returning a ranked list of documents in response to the query, wherein the document is positioned in the ranked list of documents based upon the overall ranking score for the document with respect to the query.

2. The method of claim 1 wherein the index is created using a method comprising:
identifying a set of queries;
splitting each set of queries into its constituent query terms to form a set of query terms;

selecting a subset of query terms from the set of query terms;

selecting a subset of documents in the set of documents;

for each query term in the subset of query terms:

calculating the ranking score for each document in the subset of documents using the trained machine learning model; and storing the ranking score in the index.

3. The method of claim 1 wherein the index is received from another system.

4. The method of claim 1 wherein the index is calculated on a system executing the method.

5. The method of claim 1 wherein the computer-implemented neural network is trained using a method comprising:

identifying first training data comprising a set of query-document pairs;

splitting each query-document pair into a set of query term-document pairs thereby creating second training data;

identifying a query term independent loss function; and training the computer-implemented machine learning model by minimizing the query term independent loss function against the second training data.

6. The method of claim 5 wherein the query term independent loss function is a weighted sum of term-document scores.

7. The method of claim 5 wherein the query term independent loss function is a function of a weighted sum of the difference of term-document scores for positive document examples and term-document scores for negative document examples.

8. The method of claim 5 wherein each term-document pair comprises:

a query term from a query-document pair; and one of either a positive document example from the query-document pair or a negative document example from the query-document pair.

9. The method of claim 5 wherein each term-document pair comprises:

a query term from a query-document pair;

a positive document example from the query-document pair; and a negative document example from the query-document pair.

10. A computer-readable memory comprising instructions that, when executed by a processor, cause the processor to perform acts comprising:

receiving a query that comprises a first term and a second term;

identifying a document based upon the query;

retrieving a first ranking score for the document from an index based upon the first term and the document, wherein the first ranking score was previously output by a computer-implemented neural network based upon the first term and the document;

retrieving a second ranking score from the index based upon the second term and the document, wherein the second ranking score was previously output by the computer-implemented neural network based upon the second score term and the document;

computing an overall ranking score for the document with respect to the query, wherein the overall ranking score is based upon an aggregate of the first ranking score and the second ranking score; and returning a ranked list of documents in response to the query, wherein the document is positioned in the ranked list of documents based upon the overall ranking score for the document with respect to the query.

11. The computer-readable memory of claim 10, the acts further comprising:

training the computer-implemented neural network, wherein training the computer-implemented neural network comprises:

identifying first training data comprising a set of query-document pairs;

splitting each query-document pair into a set of query term-document pairs thereby creating second training data;

identifying a query term independent loss function; and training the computer-implemented neural network by minimizing the query term independent loss function against the second training data.

12. The computer-readable memory of claim 11, wherein the query term independent loss function is a weighted sum of term-document scores.

13. The computer-readable memory of claim 11, wherein the query term independent loss function is a function of a weighted sum of the difference of term-document scores for positive document examples and term-document scores for negative document examples.

14. The computer-readable memory of claim 11, wherein each term-document pair comprises:

a query term from a query-document pair; and one of either a positive document example from the query-document pair or a negative document example from the query-document pair.

* * * * *